US012762654B2

(12) United States Patent
Kawai

(10) Patent No.: US 12,762,654 B2
(45) Date of Patent: Oct. 13, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Emi Kawai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 18/485,109

(22) Filed: Oct. 11, 2023

(65) Prior Publication Data

US 2024/0127405 A1 Apr. 18, 2024

(30) Foreign Application Priority Data

Oct. 14, 2022 (JP) ................................ 2022-165392

(51) Int. Cl.

| | |
|---|---|
| ***G06T 5/50*** | (2006.01) |
| ***G06T 3/4046*** | (2024.01) |
| ***G06T 5/70*** | (2024.01) |

(52) U.S. Cl.

CPC .............. *G06T 5/50* (2013.01); *G06T 3/4046* (2013.01); *G06T 5/70* (2024.01); (Continued)

(58) Field of Classification Search

CPC ........... G06T 5/50; G06T 3/4046; G06T 5/70; G06T 2207/20084; G06T 2207/20212; G06T 2207/30201; G06T 3/4053; G06T 3/40; G06T 2207/10016; G06T 2207/10028; G06T 2207/20192; G06T 2207/20021; G06T 7/4007; G06T 7/4076; G06T 5/00; G06T 5/60; G06T 9/002; G06T 2207/20076; G06T 2207/20081; (Continued)

(56) References Cited

U.S. PATENT DOCUMENTS

| | | | | |
|---|---|---|---|---|
| 7,916,897 B2 * | 3/2011 | Corcoran | ............. | G06V 10/446 382/118 |
| 2009/0003652 A1 * | 1/2009 | Steinberg | ................ | G06T 7/251 382/103 |

(Continued)

FOREIGN PATENT DOCUMENTS

| | | | | |
|---|---|---|---|---|
| CN | 112614107 A | * 4/2021 | ............. | G06N 3/045 |
| CN | 113705302 A | * 11/2021 | ............. | G06F 18/22 |

(Continued)

*Primary Examiner* — Jose L Couso

(74) *Attorney, Agent, or Firm* — Canon U.S.A., Inc. IP Division

(57) ABSTRACT

An image processing apparatus includes a correction unit configured to perform correction on an image, a first enlargement unit configured to enlarge the image subjected to the correction performed by the correction unit by using a neural network to produce a first enlarged image, a second enlargement unit configured to enlarge the image subjected to the correction performed by the correction unit to produce a second enlarged image, the second enlargement unit being different from the first enlargement unit, and a compositing unit configured to perform composition of the first enlarged image and the second enlarged image based on an intensity of the correction.

14 Claims, 5 Drawing Sheets

(52) U.S. Cl.
CPC ............... *G06T 2207/20084* (2013.01); *G06T 2207/20212* (2013.01); *G06T 2207/30201* (2013.01)

(58) Field of Classification Search
CPC ............. H04N 23/951; H04N 1/40068; H04N 13/128; H04N 13/271; H04N 2213/003; G06F 2209/04806; G06F 3/04845; G06F 18/214; G06F 18/22; G06F 18/241; G06F 18/24; G06F 18/2411; G06F 18/2415; G06F 30/27; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; Y10S 128/925; G09G 2340/0407; G09G 5/391
See application file for complete search history.

(56) References Cited

U.S. PATENT DOCUMENTS

| | | | | |
|---|---|---|---|---|
| 2010/0150472 | A1* | 6/2010 | Chen | G06V 10/24 382/278 |
| 2017/0032497 | A1* | 2/2017 | Sarma | G06T 3/40 |
| 2021/0150357 | A1* | 5/2021 | Karras | G06N 3/08 |
| 2021/0150369 | A1* | 5/2021 | Karras | G06N 3/047 |

FOREIGN PATENT DOCUMENTS

| | | | | |
|---|---|---|---|---|
| CN | 113727016 | A * | 11/2021 | H04N 23/951 |
| JP | 2011035593 | A | 2/2011 | |
| JP | 2020017229 | A | 1/2020 | |
| WO | 2018216207 | A1 | 11/2018 | |

* cited by examiner

IMAGE PROCESSING APPARATUS, IMAGE PROCESSING METHOD, AND STORAGE MEDIUM

BACKGROUND

Field of the Disclosure

The present disclosure relates to an image processing apparatus and in particular to an image processing apparatus that generates enlarged images with reference to a trained model.

Description of the Related Art

There have been developed techniques related to image enlargement using deep learning in recent years. Among the conventional image enlargement techniques, enlargement processing using a filtering-based method, such as bilinear interpolation or bicubic interpolation, has been generally used. However, the conventional filtering-based method has a tendency to lose the resolution feeling of an image with increase in an enlargement ratio because of low estimation accuracy of the high-frequency area.

On the other hand, for example, WO 2018/216207 discusses image enlargement processing using deep learning, allowing generation of an enlarged image with a high resolution feeling. Many image enlargement techniques based on deep learning use convolutional neural networks in particular.

However, image enlargement using deep learning can generate an image with interpolation of an inappropriate value depending on a learning-based calculation result, thus the image having a high-frequency signal emphasized excessively or noise which does not exist in the original image can be generated.

SUMMARY

According to an aspect of the present disclosure, an image processing apparatus includes a correction unit configured to perform correction on an image, a first enlargement unit configured to enlarge the image subjected to the correction performed by the correction unit by using a neural network to produce a first enlarged image, a second enlargement unit configured to enlarge the image subjected to the correction performed by the correction unit to produce a second enlarged image, the second enlargement unit being different from the first enlargement unit, and a compositing unit configured to perform composition of the first enlarged image and the second enlarged image based on an intensity of the correction.

Further features of the present disclosure will become apparent from the following description of exemplary embodiments with reference to the attached drawings.

DESCRIPTION OF THE EMBODIMENTS

An exemplary embodiment for implementing the disclosure will be described with reference to the drawings. The exemplary embodiment described below is a merely example for implementing the present disclosure, and the present disclosure is not limited to the following exemplary embodiment.

Figure 1:
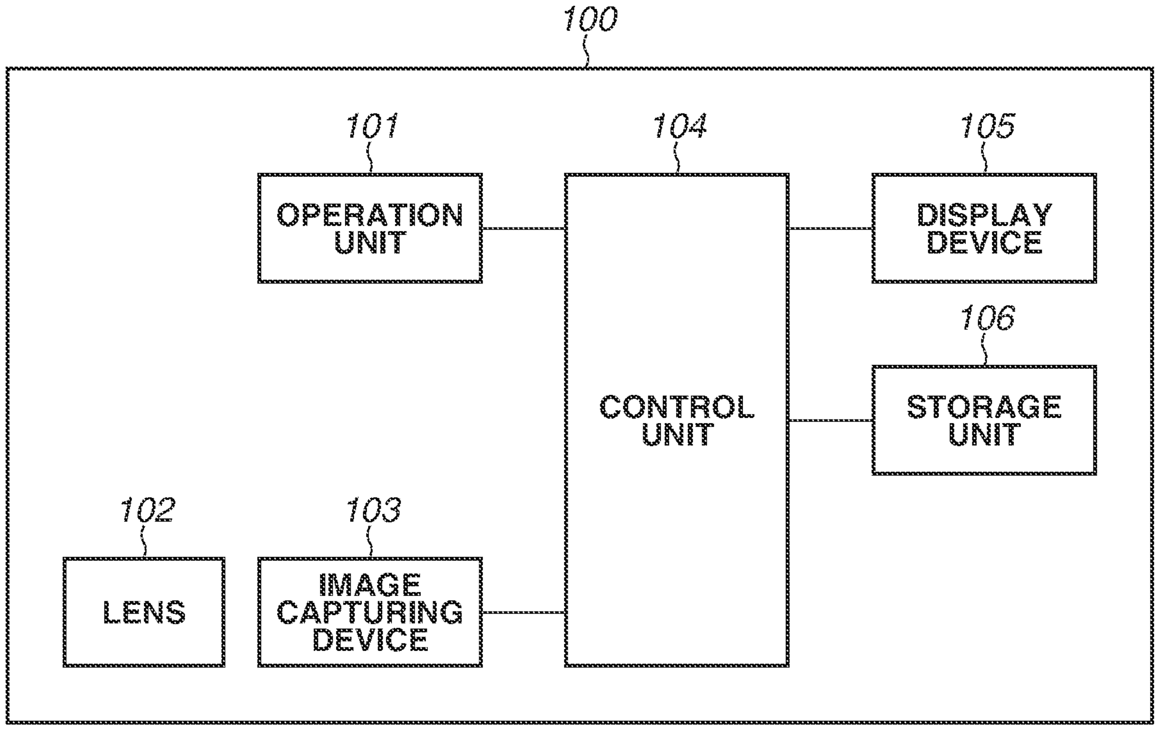
FIG. 1 is a block diagram illustrating a configuration of a digital camera according to one or more aspects of the present disclosure.

FIG. 1 is a block diagram illustrating a configuration of a digital camera 100 according to the present exemplary embodiment.

The digital camera 100 includes an operation unit 101, a lens 102, an image capturing device 103, a control unit 104, a display device 105, and a storage unit 106. The operation unit 101 is a group of input devices, such as switches and a touch panel, used by a user to operate the digital camera 100. The operation unit 101 includes a release switch for instructing the start of an image capturing preparation operation and the start of capturing an image, an image capturing mode selection switch for selecting an image capturing mode, a direction key, and an enter key. The lens 102 includes a plurality of optical lenses. The lenses included in the lens 102 include a focus adjustment lens. The image capturing device 103 is, for example, an image sensor, such as a complementary metal oxide semiconductor (CMOS) sensor or a charge-coupled device (CCD), in which a plurality of pixels (photoelectric conversion elements) is arranged, each pixel of which is provided with a color filter of red (R), green (G), or blue (B). The image capturing device 103 is also provided with peripheral circuitry, such as an amplifier circuit for performing processing on signals from the pixels. The image capturing device 103 captures a subject image formed through the lens 102, and outputs an obtained image signal to the control unit 104. The control unit 104 includes a central processing unit (CPU), a memory, and other peripheral circuits, and controls the digital camera 100. The memory included in the control unit 104 includes a dynamic random access memory (DRAM). The memory is used as a work memory when the CPU performs various kinds of signal processing, or is used as a video random access memory (VRAM) when an image is displayed on the display device 105, which will be described below. The display device 105 is an electronic viewfinder, a rear liquid crystal display, or an external display of the digital camera 100, and displays information, such as setting values of the digital camera 100, messages, a graphical user interface (GUI), such as a menu screen, and captured images. The storage unit 106 is, for example, a semiconductor memory card. In the storage unit 106, an image signal for recording (moving image data or still image data) is recorded as a data file in a predetermined format by the control unit 104.

Figure 2:
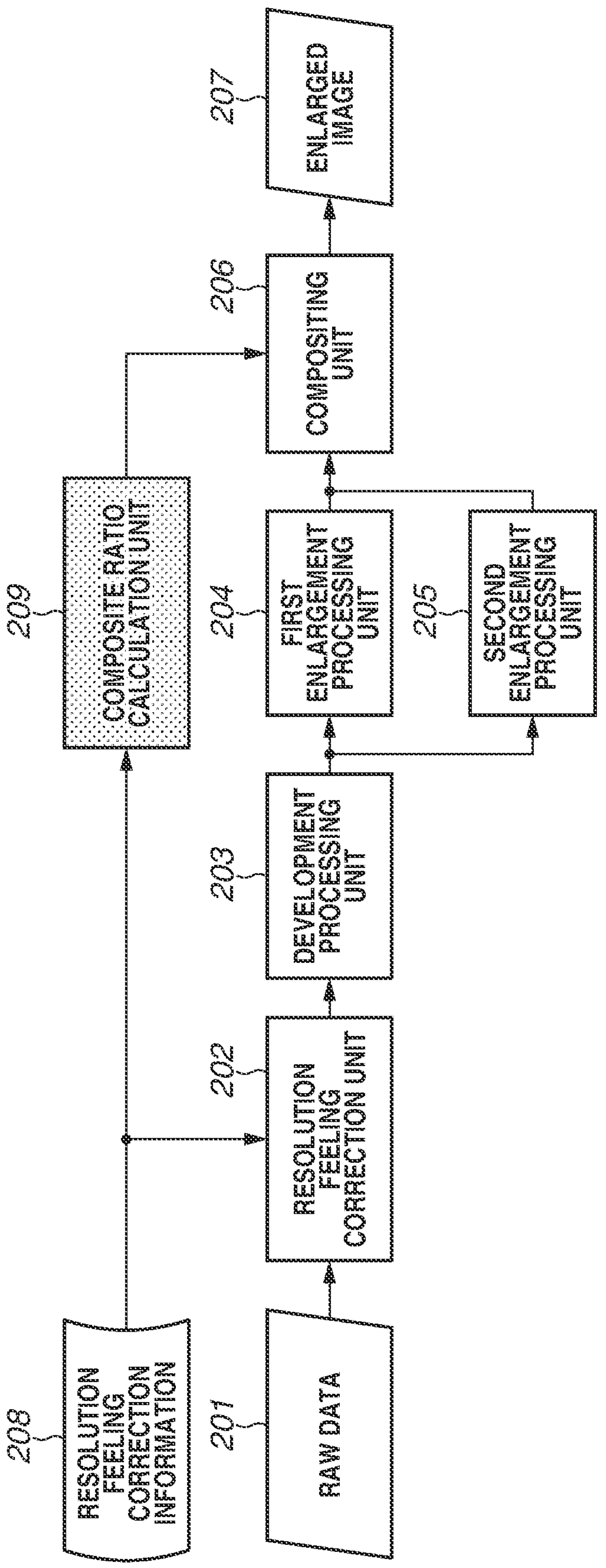
FIG. 2 is a system diagram illustrating a procedure of enlargement processing according to one or more aspects of the present disclosure.

A procedure of enlargement processing according to the present exemplary embodiment will be now described. FIG. 2 is a system diagram illustrating the procedure of enlargement processing according to the present exemplary embodiment. Each rectangular block in FIG. 2 indicates processing performed by the control unit 104. The function of the enlargement processing to be described with reference to the system diagram illustrated in FIG. 2 is started when the digital camera 100 captures an image.

First, a resolution feeling correction unit 202 performs processing for changing the resolution feeling of an image on raw data 201 captured by the image capturing device 103, based on resolution feeling correction information 208 set by the user. The resolution feeling correction information 208 indicates setting information related to the resolution feeling set by the user, and specifically includes setting information for increasing the resolution feeling, such as edge emphasis, setting information for noise reduction processing for reducing luminance noise and color noise while conversely weakening the resolution feeling, and setting information for processing for adjusting the resolution feeling in a specific area of an image, such as a skin beautification mode. In each setting, for example, the intensity of correction can be adjusted with user settings.

There are several methods for adjusting the intensity of resolution feeling correction. For example, for noise reduction processing as the resolution feeling correction, a method is used for adjusting a threshold value in smoothing filter processing. These methods allow increase or decrease of the intensity of resolution feeling correction.

Next, a development processing unit 203 performs adjustment of color, luminance, and another property after conversion into a color image represented in color information corresponding to red, green, and blue (RGB). After the development processing is completed, a first enlargement processing unit 204 and a second enlargement processing unit 205 produce an enlarged image at a certain magnification. The enlargement processing in the first enlargement processing unit 204 and the enlargement processing in the second enlargement processing unit 205 herein are performed by different methods from each other. According to the present exemplary embodiment, the first enlargement processing unit 204 performs enlargement processing using deep learning (hereinafter referred to as deep learning enlargement). On the other hand, the second enlargement processing unit 205 performs enlargement processing using a filtering-based method, such as nearest neighbor interpolation, bicubic interpolation, or bilinear interpolation (hereinafter, only bicubic enlargement will be described as an example). These outputs are composited by a compositing unit 206 at a composite ratio. The composite ratio between the enlarged images in composition are determined by a composite ratio calculation unit 209, based on the resolution feeling correction information 208. The compositing unit 206 composites the two types of enlarged images at a composite ratio calculated by the composite ratio calculation unit 209 to produce a final enlarged image 207.

The processing performed by the composite ratio calculation unit 209 will now be described in detail. The "composite ratio" between a deep-learning-enlarged-image and a bicubic-enlarged image is an important factor for providing a high-quality enlarged image. The reason for this is that a higher use rate of a bicubic-enlarged image with respect to a composited enlarged image 207 has a tendency to give a stable image quality with less adverse effects, however, together with a lower resolution feeling. On the other hand, a higher use rate of a deep-learning-enlarged image has a tendency to provide a higher resolution feeling, however, together with a tendency to exhibit an adverse effect, such as "excessive enhancement of a high-frequency area". Thus, these enlargement methods have a trade-off relationship between the resolution feeling and the stability feeling. The appropriate composite ratio depends on the resolution feeling correction information 208. This is because there is a possibility that effects of correcting resolution feelings are seen differently between images before and after deep-learning enlargement due to an "excessive enhancement of a high-frequency area" in deep learning enlargement, the excessive enhancement of which is more likely to occur with a higher resolution feeling of an image subjected to resolution feeling correction.

In the present exemplary embodiment, for example, the default composite ratio is determined to be 50:50, i.e., 50% each, and then the composite ratio calculation unit 209 calculates a composite ratio suitable for a correction intensity based on the resolution feeling correction information 208 set by the user. An example of a relationship between resolution feeling correction levels and composite ratios will now be described with respect to a method of calculating the composite ratio.

Figure 3:
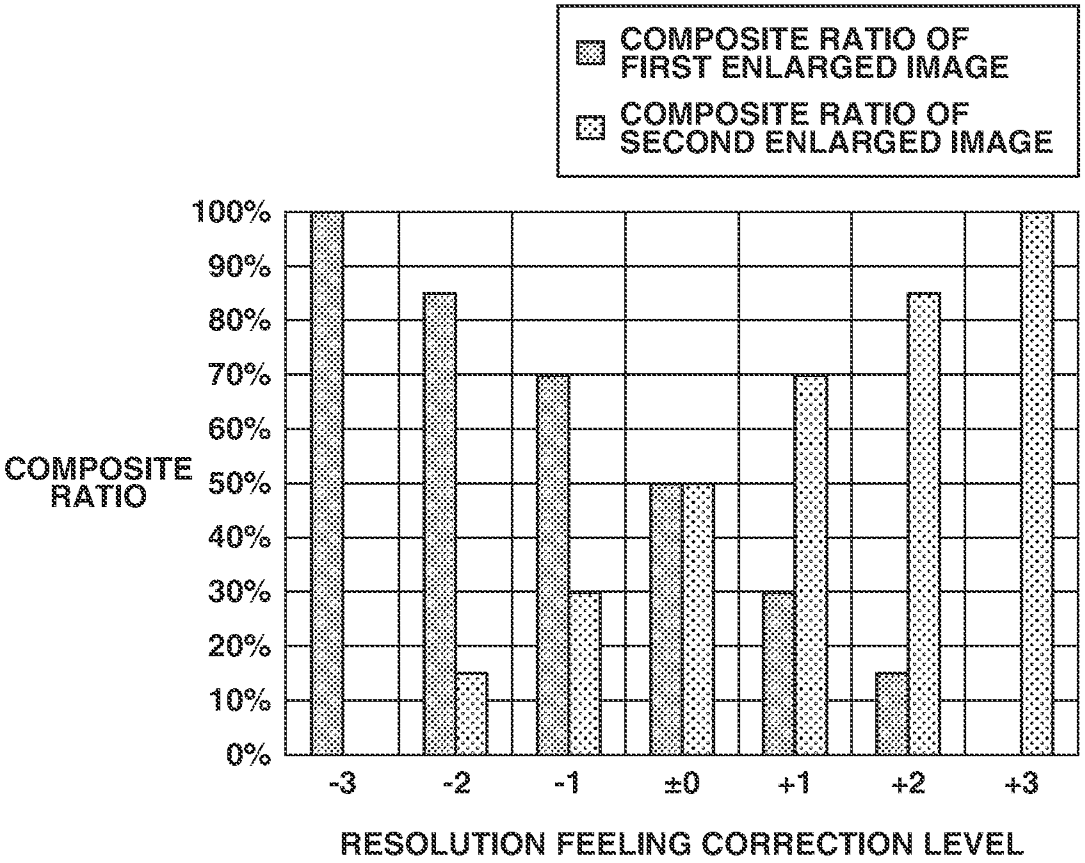
FIG. 3 is a graph illustrating a relationship between resolution feeling correction levels and composite ratios according to one or more aspects of the present disclosure.

FIG. 3 is a graph illustrating a relationship between resolution feeling correction levels and composite ratios according to the present exemplary embodiment. In the graph illustrated in FIG. 3, the resolution feeling correction levels on the horizontal axis indicate correction intensities of resolution feeling correction settings in the resolution feeling correction information 208. The resolution feeling correction settings include an intensity setting of noise reduction processing and an intensity setting of skin beautification processing as described above. The resolution feeling correction levels here are indices indicating a total correction intensity of these resolution feeling correction settings. A first enlarged image is a deep-learning-enlarged image, and a second enlarged image is a bicubic-enlarged image. In FIG. 3, the composite ratio of a bicubic-enlarged image to produce a higher resolution feeling through correction is set to be higher, and the composite ratio of a deep-learning-enlarged image to produce a lower resolution feeling through correction is set to be higher.

For example, if the user makes a setting to increase the resolution feeling, a resolution feeling correction level in the graph illustrated in FIG. 3 is on the plus side. In this case, in order to prevent an "excessive enhancement of the high-frequency area", the composite ratio of the deep-learning-enlarged image is adjusted to be lower than the default composite ratio.

While the default composite ratio between the two types of enlarged images as a reference here is set to 50:50, the default composite ratio may be set to another ratio in consideration of deep learning resistance of the default image quality. Alternatively, the composite ratio may be set to 0:100 or 100:0 as the default composite ratio.

Various modifications can be made to the method for implementing the present exemplary embodiment described above. For example, different composite ratios may be given to different areas of an image.

For example, some users want to avoid emphasizing a high frequency signal in a human skin area more than in other areas. In order to meet these users' need, there is a method of setting the composite ratio between deep learning enlargement and bicubic enlargement to 50:50, i.e., 50% each, for the "skin area" and setting the composite ratio between deep learning enlargement and bicubic enlargement to 100:0, i.e., 100% deep learning enlargement, for areas other than the "skin area" in order to increase the resolution feeling, thereby giving a stable image quality only to the minimum necessary area, enhancing the resolution feeling as much as possible. The determination of the "skin area" may be performed by a known image recognition method, for example, a method using a neural network. Alternatively, the "skin area" may be determined by a user's designation.

Here, for the resolution feeling correction information 208, correction is employed which is applied not to the whole of an image but only to a specific area in an image to adjust the resolution feeling of the specific area. For example, there is a "skin beautification correction" setting where a face area of a person in an image is detected and only noise in the face area is reduced.

In a case of a combination of the enlargement processing by the method of changing the composite ratio of the skin area described above and the "skin beautification correction", only the face area is subjected to noise reduction with the skin beautification correction setting at the resolution feeling correction unit 202, and then a composition is made at a composite ratio with which high frequencies are less likely to be emphasized only in the face area, at the compositing unit 206.

Thus, the face area in the enlarged image 207 has a potential for the skin beautification correction effect to be excessively seen.

This is because the compositing unit 206 composites the face area at a deep-learning-enlarged image of 50% and the areas other than the face area at a deep-learning-enlarged image of 100%, resulting in a relatively, increasingly emphasized skin beautification correction effect in the face area.

Figure 5:
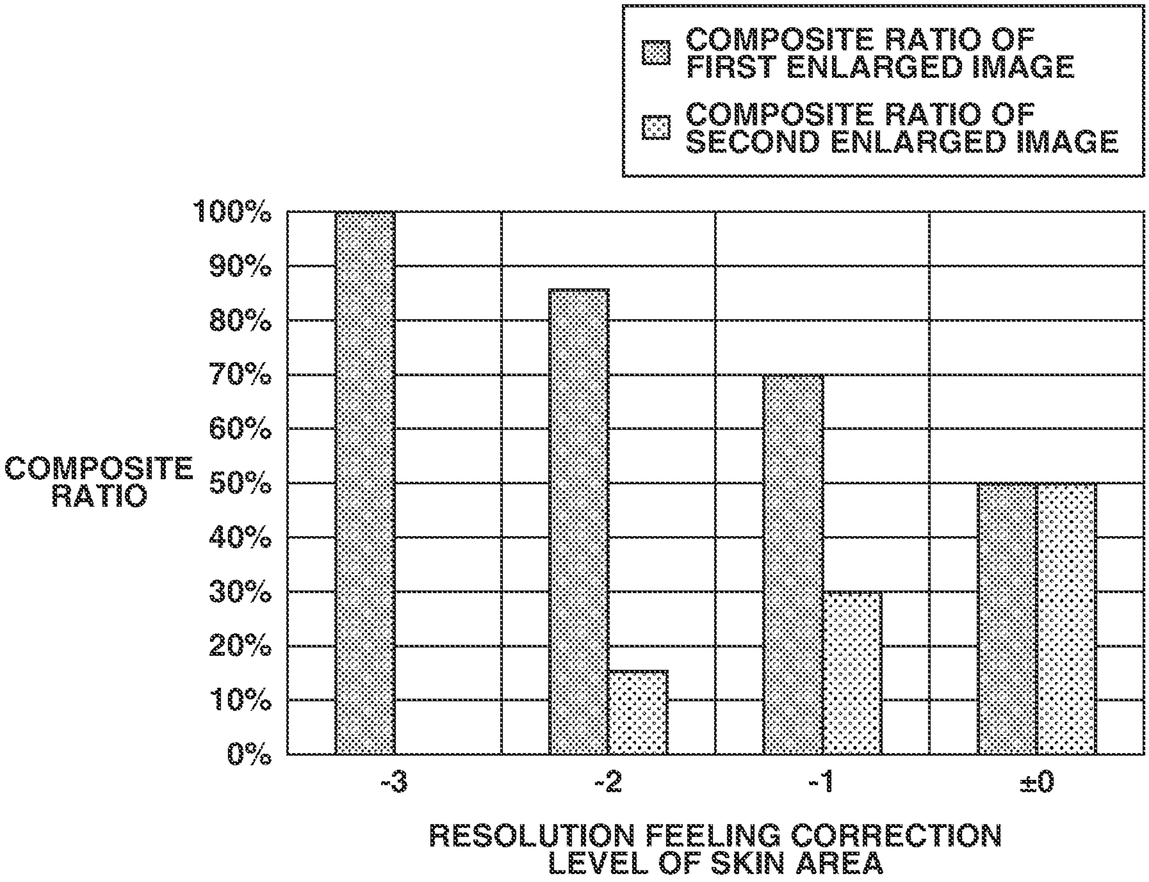
FIG. 5 is a graph illustrating a relationship between resolution feeling correction levels of a face area and composite ratios according to one or more aspects of the present disclosure.

In order to address the above issue, if the skin beautification correction and the enlargement processing are combined, the composite ratio of the skin area is adjusted based on the intensity of skin beautification selected by the user. FIG. 5 illustrates an example of how to determine the composite ratio in this case. For example, suppose that the user sets "strong skin beautification intensity", i.e., a correction for lowering the resolution feeling of the skin area corresponds to a resolution feeling correction level of −3 on the horizontal axis, the composite ratio of the deep—learning—enlarged image of the face area is increased from 50, which is the default setting, to 100. The increase of the composite ratio of the deep—learning—enlarged image of the face area prevents excessive noise reduction in a skin area in an enlarged image after the composition.

The size of the area of the resolution feeling correction also depends on the area occupied by the "skin area" in the image, which means that the composite ratio can be changed depending on the size of the "skin area". The same applies to a specific area other than the "skin area".

In addition, the timing of starting the function of the enlargement processing may depend on a setting at the time of an image being captured by the digital camera 100, or may be at the time of reproducing an image on the display device 105. If the enlargement function is carried out at the time of reproduction, the procedure of FIG. 2 can be applied as it is as long as the raw data 201 about the selected captured image remains. In this case, the correction at the resolution feeling correction unit 202 is performed based on the resolution feeling correction information 208 acquired from metadata about the raw data 201, and the processing at the development processing unit 203 is also performed based on a setting at the time of image capturing, the setting of which is added to the metadata about the raw data 201.

On the other hand, the enlargement method according to the present exemplary embodiment is also applicable to a case where image data after development is used while no raw data 201 is left.

Figure 4:
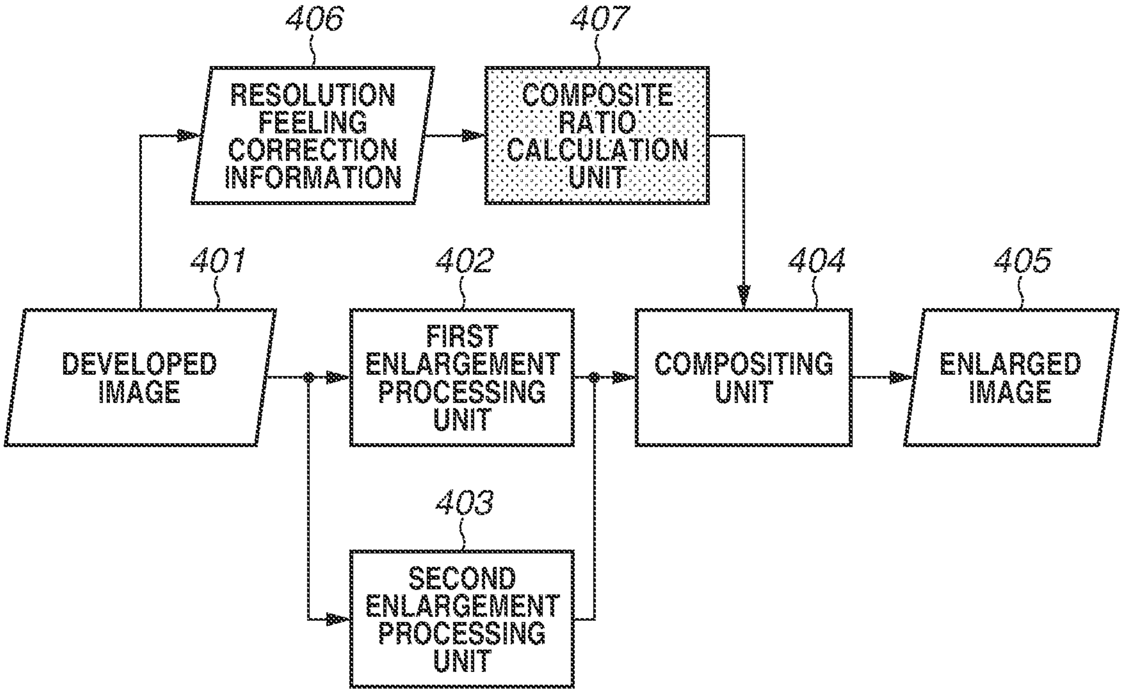
FIG. 4 is a system diagram illustrating a procedure of enlargement processing without using raw data according to one or more aspects of the present disclosure.

FIG. 4 is a system diagram illustrating a procedure of enlargement processing without using the raw data 201 according to the present exemplary embodiment. Compared with the system diagram of FIG. 2, the system diagram illustrated in FIG. 4 does not include the raw data 201, the resolution feeling correction unit 202, or the development processing unit 203. However, as illustrated in FIG. 4, if resolution feeling correction information 406 is added to metadata or another kind of data about a developed image 401, the composite ratios can be calculated in the same manner as in the case where the raw data 201 is present. A first enlargement processing unit 402, a second enlargement processing unit 403, a compositing unit 404, and a composition ratio calculation unit 407 shown in FIG. 4 are the same as the first enlargement processing unit 204, the second enlargement processing unit 205, the compositing unit 206, and the composition ratio calculation unit 209 shown in FIG. 2.

According to the present exemplary embodiment, adjustment of the composite ratios of the first enlarged image and the second enlarged image allows adjustment of the resolution feeling in a final enlarged image.

OTHER EMBODIMENTS

The "image processing apparatus" according to the above exemplary embodiment can be implemented by a personal digital camera, as well as another type of electronic device. Such electronic devices include not only digital cameras and digital video cameras but also personal computers, tablet terminals, mobile phones, game machines, and transparent goggles for augmented reality (AR) or mixed reality (MR). However, the present disclosure is not limited to these electronic devices.

Further, the present disclosure can also be implemented by processing of supplying a program for carrying out one or more functions of the above-described exemplary embodiment to a system or an apparatus via a network or a storage medium, and one or more processors in a computer of the system or the apparatus loading and running the program. The present disclosure can also be implemented by a circuit, such as an application-specific integrated circuit (ASIC), that carries out one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-165392, filed Oct. 14, 2022, which is hereby incorporated by reference herein in its entirety.

What is claimed is:

1. An image processing apparatus comprising:
one or more processors which, when executing a program stored in a memory, function as:
a correction unit configured to perform correction on an image;
a first enlargement unit configured to enlarge the image subjected to the correction performed by the correction unit by using a neural network to produce a first enlarged image;
a second enlargement unit configured to enlarge the image subjected to the correction performed by the correction unit to produce a second enlarged image, the second enlargement unit being different from the first enlargement unit; and
a compositing unit configured to perform composition of the first enlarged image and the second enlarged image based on an intensity of the correction,
wherein the second enlargement unit does not use a neural network.

2. The image processing apparatus according to claim 1, wherein the second enlargement unit uses at least one of nearest neighbor, bicubic, and bilinear methods.

3. An image processing apparatus comprising:
one or more processors which, when executing a program stored in a memory, function as:
a correction unit configured to perform correction on an image;
a first enlargement unit configured to enlarge the image subjected to the correction performed by the correction unit by using a neural network to produce a first enlarged image;
a second enlargement unit configured to enlarge the image subjected to the correction performed by the correction unit to produce a second enlarged image, the second enlargement unit being different from the first enlargement unit; and
a compositing unit configured to perform composition of the first enlarged image and the second enlarged image based on an intensity of the correction,
wherein in the first enlarged image, a high-frequency signal is more emphasized than in the second enlarged image, or the first enlarged image has a higher resolution than the second enlarged image.

4. An image processing apparatus comprising:
one or more processors which, when executing a program stored in a memory, function as:
a correction unit configured to perform correction on an image;
a first enlargement unit configured to enlarge the image subjected to the correction performed by the correction unit by using a neural network to produce a first enlarged image;
a second enlargement unit configured to enlarge the image subjected to the correction performed by the correction unit to produce a second enlarged image, the second enlargement unit being different from the first enlargement unit; and
a compositing unit configured to perform composition of the first enlarged image and the second enlarged image based on an intensity of the correction,
wherein at a first intensity as the intensity of the correction, a value of the first enlarged image in a composite ratio between the first enlarged image and the second enlarged image is higher than that at a second intensity as the intensity of the correction, the second intensity being higher in the intensity of the correction than the first intensity.

5. An image processing apparatus comprising:
one or more processors which, when executing a program stored in a memory, function as:
a correction unit configured to perform correction on an image;
a first enlargement unit configured to enlarge the image subjected to the correction performed by the correction unit by using a neural network to produce a first enlarged image;
a second enlargement unit configured to enlarge the image subjected to the correction performed by the correction unit to produce a second enlarged image, the second enlargement unit being different from the first enlargement unit; and
a compositing unit configured to perform composition of the first enlarged image and the second enlarged image based on an intensity of the correction,
wherein at a first intensity as the intensity of the correction, a value of the first enlarged image in a composite ratio between the first enlarged image and the second enlarged image is lower than that at a second intensity as the intensity of the correction, the second intensity being higher in the intensity of the correction than the first intensity.

6. An image processing apparatus comprising:
one or more processors which, when executing a program stored in a memory, function as:
a correction unit configured to perform correction on an image;
a first enlargement unit configured to enlarge the image subjected to the correction performed by the correction unit by using a neural network to produce a first enlarged image;
a second enlargement unit configured to enlarge the image subjected to the correction performed by the correction unit to produce a second enlarged image, the second enlargement unit being different from the first enlargement unit; and
a compositing unit configured to perform composition of the first enlarged image and the second enlarged image based on an intensity of the correction,
wherein the correction unit performs the correction on a partial area of the image, and
wherein the compositing unit performs the composition based on an area of the partial area subjected to the correction performed by the correction unit.

7. The image processing apparatus according to claim 6, wherein the partial area is a face area.

8. The image processing apparatus according to claim 6, wherein the partial area is a skin area.

9. The image processing apparatus according to claim 8, wherein the correction performed on the partial area by the correction unit is correction for skin beautification.

10. An image processing apparatus comprising:

one or more processors which, when executing a program stored in a memory, function as:

a correction unit configured to perform correction on an image;

a first enlargement unit configured to enlarge the image subjected to the correction performed by the correction unit by using a neural network to produce a first enlarged image;

a second enlargement unit configured to enlarge the image subjected to the correction performed by the correction unit to produce a second enlarged image, the second enlargement unit being different from the first enlargement unit; and a compositing unit configured to perform composition of the first enlarged image and the second enlarged image based on an intensity of the correction, wherein the correction unit performs the correction on a plurality of areas of the image in different correction manners, and wherein the compositing unit performs the composition of each of the plurality of areas of the image based on the correction performed on a corresponding area of the plurality of areas of the image by the correction unit.

11. The image processing apparatus according to claim 1, further comprising an image sensor configured to capture an image, wherein the correction unit performs the correction on the image acquired by using the image sensor.

12. An image processing method comprising:

performing correction on an image;

performing first enlargement of the image subjected to the correction by using a neural network to produce a first enlarged image;

performing second enlargement of the image subjected to the correction to produce a second enlarged image, the second enlargement being different from the first enlargement; and performing composition of the first enlarged image and the second enlarged image based on an intensity of the correction, wherein the second enlargement does not use a neural network.

13. A non-transitory computer-readable storage medium storing a program that causes a computer to execute an image processing method, the image processing method comprising:

performing correction on an image;

performing first enlargement of the image subjected to the correction by using a neural network to produce a first enlarged image; and performing second enlargement of the image subjected to the correction to produce a second enlarged image, the second enlargement being different from the first enlargement; and performing composition of the first enlarged image and the second enlarged image based on an intensity of the correction, wherein the second enlargement does not use a neural network.

14. An image processing apparatus comprising:

one or more processors which, when executing a program stored in a memory, function as:

a correction unit configured to perform correction on an image;

a first enlargement unit configured to enlarge the image subjected to the correction performed by the correction unit by using a neural network to produce a first enlarged image;

a second enlargement unit configured to enlarge the image subjected to the correction performed by the correction unit to produce a second enlarged image, the second enlargement unit being different from the first enlargement unit; and a compositing unit configured to perform composition of the first enlarged image and the second enlarged image based on an intensity of the correction, wherein the correction unit performs the correction on a partial area of the image, wherein the partial area is a skin area, and wherein the correction performed on the partial area by the correction unit is correction for skin beautification.

* * * * *